United States Patent
Zhou et al.

(10) Patent No.: US 12,476,908 B2
(45) Date of Patent: Nov. 18, 2025

(54) ROUTE OPTIMIZATION METHOD, PHYSICAL NETWORK DEVICE AND COMPUTER-READABLE STORAGE MEDIUM

(71) Applicant: ZTE Corporation, Shenzhen (CN)

(72) Inventors: Huijing Zhou, Shenzhen (CN); Xiang Li, Shenzhen (CN); Yajun Zhang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 488 days.

(21) Appl. No.: 18/016,662

(22) PCT Filed: Jun. 23, 2021

(86) PCT No.: PCT/CN2021/101822
§ 371 (c)(1),
(2) Date: Jan. 17, 2023

(87) PCT Pub. No.: WO2022/012287
PCT Pub. Date: Jan. 20, 2022

(65) Prior Publication Data
US 2023/0300062 A1    Sep. 21, 2023

(30) Foreign Application Priority Data
Jul. 17, 2020 (CN) .......... 202010691500.X

(51) Int. Cl.
*H04L 45/00* (2022.01)
*H04L 43/12* (2022.01)
(Continued)

(52) U.S. Cl.
CPC .............. *H04L 45/54* (2013.01); *H04L 43/12* (2013.01); *H04L 45/124* (2013.01); *H04L 45/64* (2013.01); *H04L 2212/00* (2013.01)

(58) Field of Classification Search
CPC ....... H04L 45/54; H04L 43/12; H04L 45/124; H04L 45/64; H04L 2212/00
(Continued)

(56) References Cited

U.S. PATENT DOCUMENTS

| 2008/0144627 A1 | 6/2008 | Ballantyne et al. |
| 2010/0061385 A1* | 3/2010 | Welin ............ H04L 45/64 |
| | | 380/277 |

(Continued)

FOREIGN PATENT DOCUMENTS

| CN | 108092888 A | 5/2018 |
| CN | 109379241 A | 2/2019 |

(Continued)

OTHER PUBLICATIONS

International Search Report and Written Opinion for International Application No. PCT/CN2021/101822, mailed Aug. 20, 2021.
(Continued)

*Primary Examiner* — Hermon Asres
(74) *Attorney, Agent, or Firm* — Wolf, Greenfield & Sacks, P.C.

(57) ABSTRACT

A route optimization method, a physical network device and a computer-readable storage medium are disclosed. The method may include: acquiring a probe packet from at least one second physical network device, where the probe packet includes a host name and interface information; generating, according to the probe packet, an underlay routing table corresponding to an underlay network, where the underlay routing table includes the host name and the interface information; synchronizing the underlay routing table to a local corresponding overlay network to enable the overlay network to generate an overlay routing table; acquiring a service packet through the overlay network and determining a target physical network device, and determining, accord-
(Continued)

ing to the overlay routing table, a target path corresponding to the target physical network device; and transmitting, through the target path, the service packet to a target overlay network corresponding to the target physical network device.

15 Claims, 10 Drawing Sheets

(51) Int. Cl.
 *H04L 45/12* (2022.01)
 *H04L 45/64* (2022.01)
(58) Field of Classification Search
 USPC .......................................................... 370/389
 See application file for complete search history.

(56) References Cited

U.S. PATENT DOCUMENTS

| | | | | |
|---|---|---|---|---|
| 2013/0100815 | A1* | 4/2013 | Kakadia | ............... H04L 45/124 370/328 |
| 2015/0124644 | A1 | 5/2015 | Pani | |
| 2020/0014616 | A1 | 1/2020 | Michael et al. | |
| 2020/0021514 | A1* | 1/2020 | Michael | ................ H04L 45/124 |
| 2022/0052945 | A1* | 2/2022 | Peng | ..................... H04W 40/02 |

FOREIGN PATENT DOCUMENTS

| | | |
|---|---|---|
| CN | 110677337 A | 1/2020 |
| CN | 110875896 A | 3/2020 |
| CN | 110912795 A | 3/2020 |
| CN | 111314196 A | 6/2020 |
| WO | WO 2018/145761 A1 | 8/2018 |

OTHER PUBLICATIONS

First Search Report for Chinese Application No. 202010691500.X, dated Jan. 21, 2025.
First Office Action for Chinese Application No. 202010691500.X, dated Jan. 25, 2025.
Nakao et al., A Routing Underlay for Overlay Networks. InProceedings of the 2003 conference on Applications, technologies, architectures, and protocols for computer communications, Aug. 25, 2003:11-8.
Extended European Search Report for European Application No. 21841848.1, dated Nov. 22, 2023.

* cited by examiner

| hostID | portID | peerhostID | max speed | status | delay/jitter ms | rx Mbps | tx Mbps | drop pps |
|---|---|---|---|---|---|---|---|---|
| hostnanme1 | IF12 | hostname2 | 100G | up | 0.1 | 10000 | 50000 | 4 |
| | IF13 | hostname3 | 100G | down | 0.1 | 0 | 0 | 0 |
| | IF15 | hostname5 | 100G | up | 0.3 | 30000 | 10000 | 0 |
| hostnanme2 | IF21 | hostname1 | 100G | up | 0.1 | 30000 | 10000 | 0 |
| | IF24 | hostname4 | 100G | up | 0.1 | 30000 | 10000 | 0 |
| | IF26 | hostname6 | 100G | up | 0.1 | 30000 | 10000 | 0 |
| hostnanme3 | IF31 | hostname1 | 100G | up | 0.1 | 30000 | 10000 | 0 |
| | IF35 | hostname5 | 100G | up | 0.1 | 30000 | 10000 | 0 |
| | IF38 | hostname2 | 100G | up | 0.1 | 30000 | 10000 | 0 |
| hostnanme4 | IF42 | hostname2 | 100G | up | 0.1 | 30000 | 10000 | 0 |
| | IF43 | hostname3 | 100G | up | 0.1 | 30000 | 10000 | 0 |
| | IF47 | hostname7 | 100G | up | 0.1 | 30000 | 10000 | 0 |
| hostnanme5 | IF51 | hostname1 | 100G | up | 0.1 | 30000 | 10000 | 0 |
| | IF56 | hostname6 | 100G | up | 0.1 | 30000 | 10000 | 0 |
| | IF58 | hostname8 | 100G | up | 0.1 | 30000 | 10000 | 0 |
| | export51 | null | 40G | up | 0.1 | 30000 | 10000 | 0 |
| hostnanme6 | IF62 | hostname2 | 100G | up | 0.1 | 30000 | 10000 | 0 |
| | IF65 | hostname5 | 100G | up | 0.1 | 30000 | 10000 | 0 |
| | IF67 | hostname7 | 100G | up | 0.1 | 30000 | 10000 | 0 |
| hostnanme7 | IF74 | hostname4 | 100G | up | 0.1 | 30000 | 10000 | 0 |
| | IF76 | hostname6 | 100G | up | 0.1 | 30000 | 10000 | 0 |
| | IF78 | hostname8 | 100G | up | 0.1 | 30000 | 10000 | 0 |
| hostnanme8 | IF83 | hostname3 | 100G | up | 0.1 | 30000 | 10000 | 0 |
| | IF85 | hostname5 | 100G | up | 0.1 | 30000 | 10000 | 0 |
| | IF87 | hostname7 | 100G | up | 0.1 | 30000 | 10000 | 0 |
| | export81 | null | 40G | up | 0.1 | 30000 | 10000 | 0 |

Fig. 5

| src_host | dst_host | potrID | cost | potrID | cost | potrID | cost | potrID | cost | potrID | cost |
|---|---|---|---|---|---|---|---|---|---|---|---|
| hostname1 | hostname5 | IF15 | 1÷(30+10)/100*3+0.3*3+0*0.1=3.1 | | | | | | | | |
| | | IF12 | 1÷(10+50)/100*3+0.1*3+4*0.1=3.5 | IF26 | 2.8 | IF65 | 3.0 | | | | |
| | | IF12 | 1÷(10+50)/100*3+0.1*3+4*0.1=3.5 | IF24 | 1.3 | IF47 | 2.8 | IF76 | 2.9 | IF65 | 2.1 |
| | hostname8 | IF13 | 0xffff | IF38 | | | | | | | |
| | | IF12 | Calculate in the above manner (omitted) | IF24 | | IF43 | | IF38 | | | |
| | | IF12 | Calculate in the above manner (omitted) | IF24 | | IF47 | | IF78 | | | |
| | | IF12 | Calculate in the above manner (omitted) | IF26 | | IF67 | | IF78 | | | |
| | hostname2 | Omitted | Calculate in the above manner (omitted) | | | | | | | | |
| | hostname3 | Omitted | Calculate in the above manner (omitted) | | | | | | | | |
| | hostname4 | Omitted | Calculate in the above manner (omitted) | | | | | | | | |
| | hostname6 | Omitted | Calculate in the above manner (omitted) | | | | | | | | |
| | hostname7 | Omitted | Calculate in the above manner (omitted) | | | | | | | | |

Fig. 6

Select from the overlay routing table a path having a minimum cost value among the paths corresponding to the target physical network device as the target path — S600

Fig. 7

In response to the underlay network updating the interface information, synchronize a new underlay routing table corresponding to the underlay network to the local corresponding overlay network — S710

Generate a new overlay routing table by the overlay network according to the host name and the updated interface information in the new underlay routing table — S720

In response to the cost value of the target path in the new overlay routing table reaching a preset upper limit value, determine, according to the new overlay routing table, a new target path corresponding to the target physical network device — S730

Transmit the service packet to the target overlay network corresponding to the target physical network device through the new target path — S740

Fig. 8

| Encapsulate the service packet in a tunnel format, and transmit the encapsulated service packet to the target physical network device through the target path, so that the target physical network device decapsulates the service packet and transmits the decapsulated service packet to the target overlay network corresponding to the target physical network device | ~S800 |
|---|---|

Fig. 9

Outer UDP Header:

| Source Port | Dest Port=4790 |
|---|---|
| UDP Length | UDP Checksum |

VXLAN GPE Header:

| R | R | Ver | I | P | R | O | Reserved | Next Protocol |
|---|---|---|---|---|---|---|---|---|
| VXLAN Network Identifier(VNI) | | | | | | | | Reserved |

Fig. 10

| Transmit the service packet to an intermediate physical network device to enable the intermediate physical network device to forward, according to the target path, the service packet to the target overlay network corresponding to the target physical network device | ~S900 |
|---|---|

Fig. 11

ROUTE OPTIMIZATION METHOD, PHYSICAL NETWORK DEVICE AND COMPUTER-READABLE STORAGE MEDIUM

CROSS-REFERENCE TO RELATED APPLICATION

This application is a national stage filing under 35 U.S.C. § 371 of international application number PCT/CN2021/101822, filed Jun. 23, 2021, which claims priority to Chinese patent application No. 202010691500.X filed on Jul. 17, 2020. The contents of these applications are incorporated herein by reference in their entirety.

TECHNICAL FIELD

Embodiments of the present disclosure relate to, but are not limited to, the field of communications technologies, and in particular, to a route optimization method, a physical network device, and a computer-readable storage medium.

BACKGROUND

With the explosion of fifth generation (5G) subscribers, it is necessary to provide device connectivity and network capacity larger than that in technologies of the previous generation. Therefore, for 5G, virtualization may take over most of edge elements in the 5G network, in particular, access to a radio access network (RAN) and a user equipment (UE). Since 5G needs to handle different services and devices at the edge, the 5G network will use a network slicing technology to divide one physical infrastructure into multiple virtual networks so that each slice provides a different and unique connection under the same infrastructure.

To achieve such flexibility, each slice has to be able to access resources of different types, both physical and virtual, and thus 5G revolutionizes the architecture of the network using network programmability through a software defined network (SDN) and virtualizes the actual physical network. In view of implementation, virtual networks mostly use an overlay technology to quickly provide logical networks having different requirements and mutually isolated. However, the overlay network and the underlay physical network are at different network layers and addressing and routing independently of each other. Therefore, packets from different nodes are very likely to choose the same path or the same gateway (GW). As a result, network resources cannot be utilized faster and better, and fast and reliable network services cannot be provided for various applications.

SUMMARY

The following is a summary of the subject matters described in detail herein. This summary is not intended to limit the scope of protection of the appended claims.

Embodiments of the present disclosure provide a route optimization method, a physical network device and a computer-readable storage medium.

In accordance with a first aspect of the present disclosure, an embodiment provides a route optimization method which is applied to a first physical network device, the method may include: acquiring a probe packet from at least one second physical network device, where the probe packet includes a host name of the second physical network device and interface information of the second physical network device; generating, according to the probe packet, an underlay routing table corresponding to an underlay network, where the underlay routing table includes the host name of the second physical network device and the interface information of the second physical network device; synchronizing the underlay routing table to a local corresponding overlay network to enable the overlay network to generate an overlay routing table according to the host name and the interface information in the underlay routing table; acquiring a service packet through the overlay network and determining a target physical network device, and determining, according to the overlay routing table, a target path corresponding to the target physical network device; and transmitting the service packet to a target overlay network corresponding to the target physical network device through the target path.

In accordance with a second aspect of the present disclosure, an embodiment further provides a first physical network device, which may include: a memory, a processor, and a computer program stored in the memory and executable by the processor, where the computer program, when executed by the processor, causes the processor to perform the route optimization method described above.

In accordance with a third aspect of the present disclosure, an embodiment further provides a computer-readable storage medium storing computer-executable instructions which, when executed by a processor, cause the processor to perform the route optimization method described above.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the appended claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

FIG. 5 is a schematic diagram of an underlay global routing table generated in a route optimization method according to an embodiment of the present disclosure;

FIG. 6 is a schematic diagram of an overlay global routing table generated in a route optimization method according to an embodiment of the present disclosure;

FIG. 7 is a flowchart of a route optimization method provided by another embodiment of the present disclosure;

FIG. 8 is a flowchart of a route optimization method provided by another embodiment of the present disclosure;

FIG. 9 is a flowchart of a route optimization method provided by another embodiment of the present disclosure;

FIG. 10 is a schematic diagram of transmitting an extension header provided by an embodiment of the present disclosure;

FIG. 11 is a flowchart of a route optimization method provided by another embodiment of the present disclosure;

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a functional module division is shown in the schematic diagrams of the device and a logical order is shown in the flowcharts, the steps shown or described may be executed, in some cases, in a different module division from that of the device or in a different order from that in the flowcharts. The terms "first", "second", etc. in the description, the appended claims or the above-mentioned drawings are intended to distinguish between similar objects and are not necessarily to describe a specific order or sequence.

The present disclosure provides a route optimization method, a physical network device and a computer-readable storage medium. The route optimization method includes the following steps: a first physical network device acquires a probe packet from at least one second physical network device, where the probe packet includes a host name of the second physical network device and interface information of the second physical network device; generates, according to the probe packet, an underlay routing table corresponding to an underlay network, where the underlay routing table includes the host name of the second physical network device and the interface information of the second physical network device; and then, the first physical network device synchronizes the underlay routing table to a local corresponding overlay network to enable the overlay network to generate an overlay routing table according to the host name and the interface information in the underlay routing table. In the case where the overlay network acquires the service packet and determines the target physical network device, the first physical network device determines, according to the overlay routing table, a target path corresponding to the target physical network device, and transmits the service packet to a target overlay network corresponding to the target physical network device through the target path. In this technical scheme, the overlay network of the first physical network device can obtain the topology and the interface connections of the underlay network according to the overlay routing table and can select an appropriate path according to the target physical network device to guide the forwarding of the service packet. Therefore, the embodiments of the present disclosure can optimize the utilization of network resources and meet the requirements of reliable and fast forwarding on the network.

The embodiments of the present disclosure will be further explained below with reference to the accompanying drawings.

Figure 1:
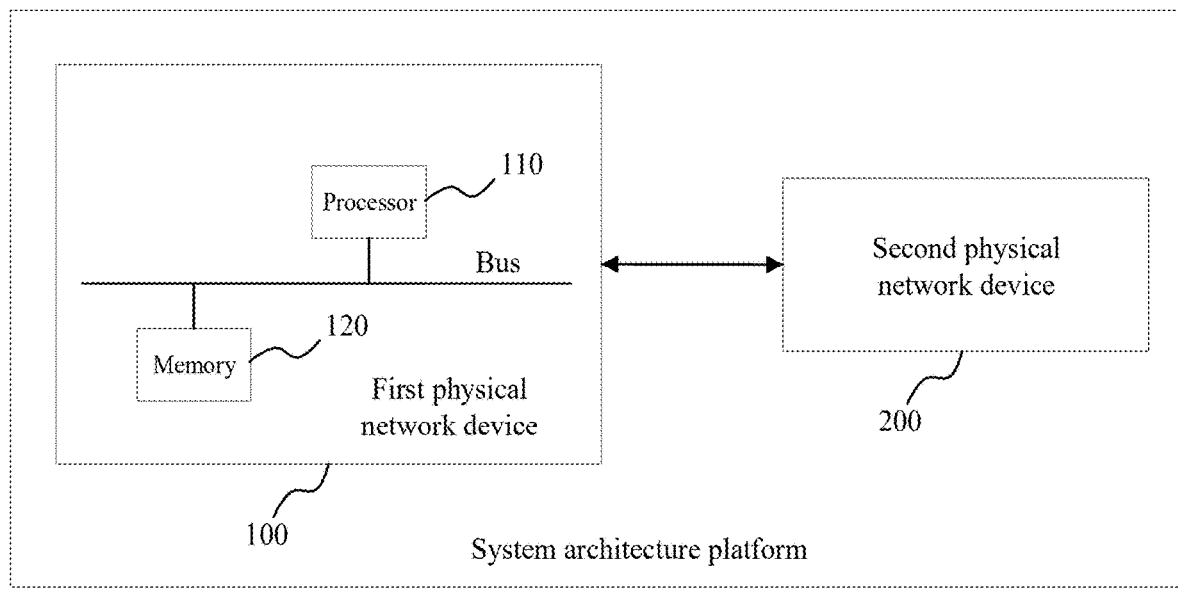
FIG. 1 is a schematic diagram of a system architecture platform for performing a route optimization method provided by an embodiment of the present disclosure.

As shown in FIG. 1, FIG. 1 is a schematic diagram of a system architecture platform for performing a route optimization method provided by an embodiment of the present disclosure.

In the example in FIG. 1, the system architecture platform includes a first physical network device 100 and at least one second physical network device 200. The first physical network device 100 is provided with a memory 120 and a processor 110, where the memory 120 and the processor 110 may be connected by a bus or in other ways. In FIG. 1, the connection is realized by a bus for example.

As a non-transitory computer-readable storage medium, the memory 120 may be used to store a non-transitory software program and a non-transitory computer-executable program. In addition, the memory 120 may include a high-speed random access memory and a non-transitory memory, for example, at least one magnetic disk storage device, a flash memory device, or another non-transitory solid-state storage device. In some embodiments, the memory 120 may include memories remotely located with respect to the processor 110, and these remote memories may be connected to the system architecture platform via a network. Examples of the above-mentioned network include, but are not limited to, the Internet, an intranet, a local area network, a mobile communication network, and a combination thereof.

In some cases, with the explosion of 5G subscribers, it is necessary to provide device connectivity and network capacity larger than that in technologies of the previous generation. Therefore, for 5G, virtualization may take over most of edge elements in the 5G network, in particular, access to a RAN and UE. Since 5G needs to handle different services and devices at the edge, the 5G network will use a network slicing technology to divide one physical infrastructure into multiple virtual networks so that each slice provides a different and unique connection under the same infrastructure.

To achieve such flexibility, each slice has to be able to access resources of different types, both physical and virtual, and thus 5G revolutionizes the architecture of the network using network programmability through an SDN and virtualizes the actual physical network. In view of implementation, virtual networks mostly use an overlay technology to quickly provide logical networks having different requirements and mutually isolated. However, the overlay network and the underlay physical network are at different network layers and addressing and routing independently of each other. Therefore, packets from different nodes are very likely to choose the same path or the same GW. As a result, network resources cannot be utilized faster and better, and fast and reliable network services cannot be provided for various applications.

Therefore, based on the above situations, in the system architecture platform provided by the example of FIG. 1, the first physical network device 100 may acquire the probe packet from the second physical network device 200 and generate the underlay routing table corresponding to the underlay network according to the probe packet. Both the probe packet and the underlay routing table include the host name and the interface information of the second physical network device 200. Then, the first physical network device 100 synchronizes the underlay routing table to the local corresponding overlay network so that the overlay network generates the overlay routing table according to the host name and interface information in the underlay routing table; in response to the overlay network of the first physical network device 100 needing to forward the service packet to the target physical network device, the overlay network determines the target path corresponding to the target physical network device according to the overlay routing table, and finally the service packet is transmitted to a target overlay network corresponding to the target physical network device through the target path. According to the schemes provided by the embodiments of the present disclosure, the overlay network of the first physical network device 100 can obtain the topology and the interface connections of the underlay network according to the overlay routing table and can select an appropriate path according to the target physical network device to guide the forwarding of the service packet. Therefore, the embodiments of the present disclosure can optimize the utilization of network resources and meet the requirements of reliable and fast forwarding on the network.

It is to be understood by those having ordinary skill in the art that the system architecture platform can be applied to a 3G communications network system, an LTE communications network system, a 5G communications network system, and subsequent evolved mobile communications network systems, etc., and this embodiment is not specifically limited thereto.

Those having ordinary skill in the art may understand that the system architecture platform shown in FIG. 1 does not constitute a limitation on the embodiments of the present disclosure and may include more or fewer components than illustrated, or combine some of the components, or use a different arrangement of the components.

In the system architecture platform shown in FIG. 1, the processor 110 may invoke a route optimization program stored in the memory 120 to thereby execute a route optimization method between the first physical network device 100 and the second physical network device 200.

Based on the system architecture platform, various embodiments of the route optimization method of the present disclosure are provided hereinafter.

Figure 2:
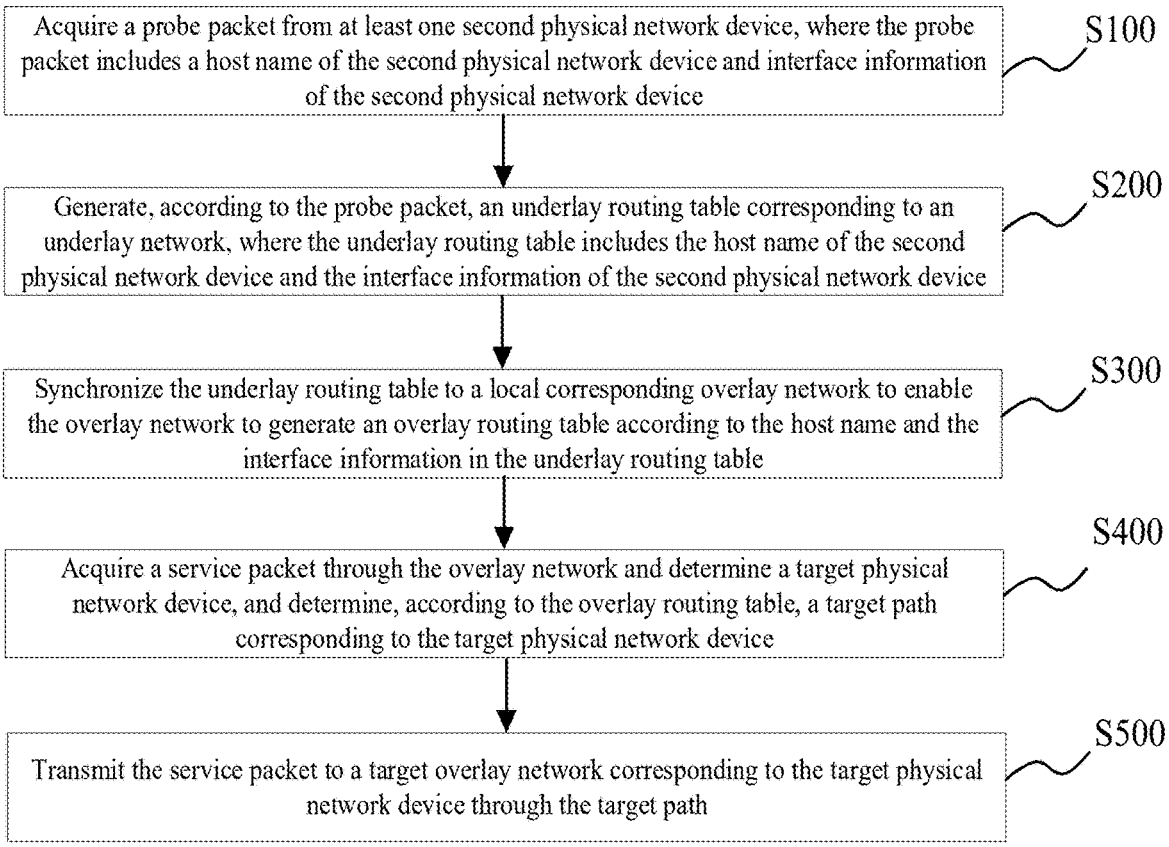
FIG. 2 is a flowchart of a route optimization method provided by an embodiment of the present disclosure.

As shown in FIG. 2, FIG. 2 is a flowchart of a route optimization method provided by an embodiment of the present disclosure. The route optimization method may be applied to a first physical network device and includes, but is not limited to, steps S100, S200, S300, S400 and S500.

At S100, a probe packet is acquired from at least one second physical network device, where the probe packet includes a host name of the second physical network device and interface information of the second physical network device.

In an embodiment, in the case where the first physical network device and the second physical network device are powered up, at least one second physical network device integrates a host name of itself and interface information of each interface of itself into the probe packet and transmits the probe packet to the first physical network device, and thus the first physical network device obtains the probe packet of the at least one second physical network device so that the first physical network device obtains a host name and interface information of each second physical network device.

Alternatively, in another embodiment, a 1st second physical network device transmits a probe packet to a 2nd second physical network device at the peer end, then the 2nd second physical network device adds a host name and interface information in the probe packet corresponding to the 1st second physical network device to a probe packet corresponding to the 2nd second physical network device itself, then the 2nd second physical network device transmits the probe packet carrying host names and interface information of the 1st second physical network device and the 2nd second physical network device to a third second physical network device, and so on, until an N-th (N is a positive integer) second physical network device transmits a probe packet carrying host names and interface information of multiple second physical network devices to the first physical network device, and thus the first physical network device obtains the probe packet of multiple second physical network devices so that the first physical network device learns the host names and the interface information of the second physical network devices.

Figure 3:
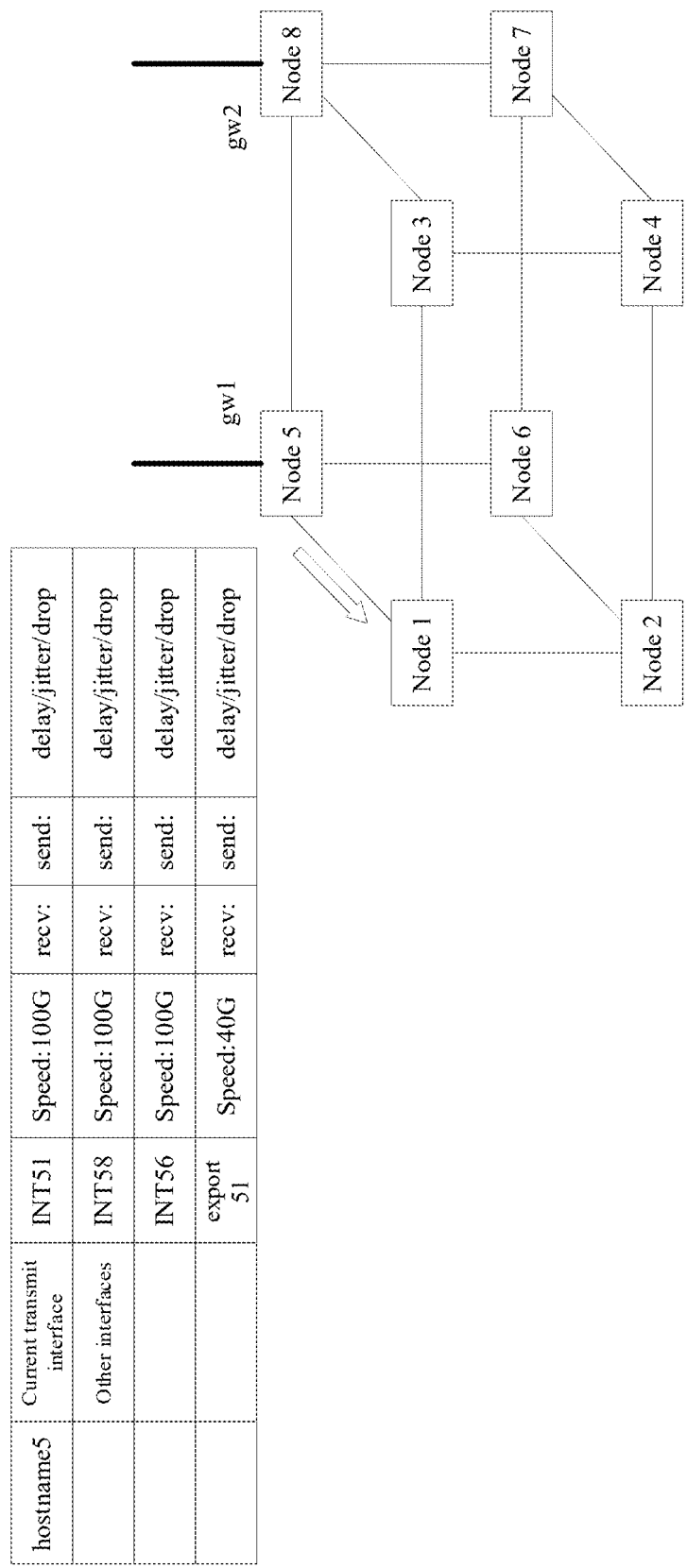
FIG. 3 is a topology diagram provided by an embodiment of the present disclosure.
Figure 4:
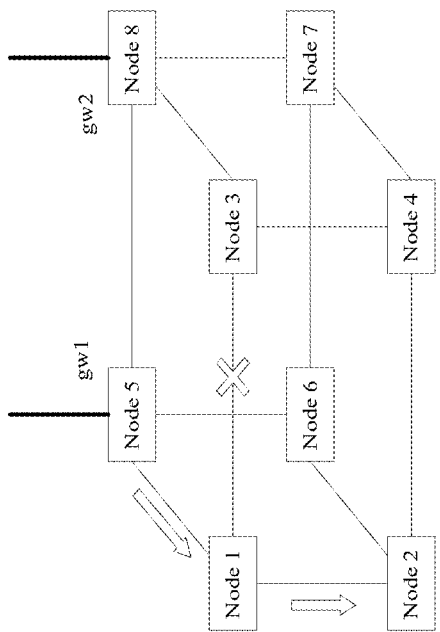
FIG. 4 is a schematic diagram of transmitting a probe packet in a route optimization method according to an embodiment of the present disclosure.

For example, as shown in FIGS. 3 and 4, nodes 1 to 8 are physical network devices. If the node 1 is the first physical network device, the nodes 2 to 8 are all second physical network devices, the node 5 can transmit a probe packet carrying a host name of the node 5 itself and interface information of each interface of the node 5 itself directly to the node 1 at the peer end; and secondly, the node 6 can also transmit a probe packet carrying a host name of the node 6 itself and interface information of each interface of the node 6 itself directly to the node 2 at the peer end, then the node 2 adds the host name and the interface information in the probe packet corresponding to the node 6 to a probe packet corresponding to the node 2 itself, and forwards a probe packet carrying the host names and the interface information of the nodes 6 and 2 to the node 1 so that the node 1 obtains the host names and the interface information of the nodes 5, 6 and 2. In this way, the node 1 can be enabled to obtain all of the host names and the interface information of the nodes 2 to 8.

It is to be noted that the embodiments of the present disclosure can configure the number of hops for forwarding probe packets according to the actual situation of the planned networking so that each node can acquire the topology and the interface connections of the underlay network. With reference to the network architecture shown in FIGS. 3 and 4, in the embodiments of the present disclosure, each probe packet is forwarded twice, and when it is received for the third time, the forwarding is terminated.

It is to be noted that the above interface information may include, but is not limited to, at least one of interface maximum speed information, current packet receive and transmit speed information, delay information, jitter information, or packet loss information.

It is to be understood that the first physical network device and the second physical network device described above may be a physical server or another physical device having a software control system.

At S200, an underlay routing table corresponding to an underlay network is generated according to the probe packet, where the underlay routing table includes the host name of the second physical network device and the interface information of the second physical network device.

In an embodiment, since the first physical network device acquires the host name and the interface information of each second physical network device, the link and interface information of the global underlay network will be formed through convergence on the first physical network device, thereby generating the underlay routing table corresponding to the underlay network. Here, the underlay routing table includes the first physical network device and the host names and the interface information of the second physical network devices.

For example, as shown in FIGS. 3 to 5, if the node 1 acquires all of the host names and the interface information of the nodes 2 to 8, the link and interface information of the global underlay network will be formed through convergence on the node 1, and the underlay routing table is generated, as shown in FIG. 6.

At S300, the underlay routing table is synchronized to a local corresponding overlay network to enable the overlay network to generate an overlay routing table according to the host name and the interface information in the underlay routing table.

In an embodiment, after generating the underlay routing table corresponding to the underlay network, the first physical network device synchronizes information of the underlay routing table to a local corresponding overlay network for the first physical network device, and then the local corresponding overlay network for the first physical network device generates the overlay routing table according to the acquired host name and interface information in the underlay routing table.

It is to be noted that the above overlay routing table includes a cost value of a path from the first physical network device to each second physical network device. Here, cost values of paths are determined by the interface information in the underlay routing table. The cost values may be calculated, according to the actual situation of the network, respectively by adding weights to the interface information in the underlay routing table, where the calculation formula for the cost value is as follows:

$$\text{cost} = D + \frac{rx + tx}{\text{max speed}} * k_1 + (\text{delay/jitter}) * k_2 + \text{drop} * k_3$$

In the formula, D denotes a cost datum of an outgoing interface of the first physical network device, rx denotes the packet receive speed information in the underlay routing table, tx denotes the packet transmit speed information in the underlay routing table, max speed denotes the interface maximum speed information in the underlay routing table, $k_1$ denotes a bandwidth-occupied ratio weight for transmitting and receiving, delay denotes the delay information in the underlay routing table, jitter denotes the jitter information in the underlay routing table, $k_2$ denotes a delay jitter weight, drop denotes the packet loss information in the underlay routing table, and $k_3$ denotes a weight for packet-loss number within one period.

For example, as shown in FIGS. 5 and 6, if D is 1, $k_1$ is 3, $k_2$ is 3, and $k_3$ is 1, then according to the underlay routing table in FIG. 5 and the above calculation formula of the cost value, a cost value of directly routing from the node 1 to the node 5 may be obtained; a cumulative cost value from the node 1 to the node 5 through the node 2 and the node 6 in turn may also be calculated; a cumulative cost value from the node 1 to the node 5 through the node 2, the node 4, the node 7, and the node 6 in turn may also be calculated. In this manner, cost values of all paths from the node 1 to the node 5 may be calculated. In this way, cost values of all paths from the node 1 to any one of the nodes 2 to 8 may be calculated, as shown in FIG. 6.

It is to be noted that the synchronization manner for synchronizing the underlay routing table to the local corresponding overlay network may include, but is not limited to, periodic synchronization and/or change synchronization. Here, the periodic synchronization may refer to each time a preset time period is reached, synchronizing the information of the underlay routing table to the local corresponding overlay network; and the change synchronization may refer to in response to the information of the underlay routing table having any changes, synchronizing information of the changed underlay routing table to the local corresponding overlay network.

At S400, a service packet is acquired through the overlay network and a target physical network device is determined, and a target path corresponding to the target physical network device is determined according to the overlay routing table.

In an embodiment, after the overlay network corresponding to the first physical network device generates the overlay routing table, if the overlay network corresponding to the first physical network device needs to transmit the service packet to the target physical network device, the overlay routing table includes information of various paths from the first physical network device to the target physical network device, so the overlay network corresponding to the first physical network device can select an appropriate target path according to the overlay routing table and the target physical network device.

The overlay routing table includes the cost values of various paths from the first physical network device to each second physical network device, and the target physical network device is one of the second physical network devices, so the overlay routing table also includes the cost values of the various paths from the first physical network device to the target physical network device. Here, the cost values of the various paths are determined by the interface information in the underlay routing table.

For example, as shown in FIG. 6, the cost value of directly routing from the node 1 to the node 5 is 3.1, the cumulative cost value of routing from the node 1 to the node 5 through the node 2 and the node 6 in turn is 9.3, and the cumulative cost value of routing from the node 1 to the node 5 through the node 2, the node 4, the node 7 and the node 6 in turn is 12.6, etc., and it can be learned that the cost value of directly routing from the node 1 to the node 5 is the minimum. Costs of all interfaces on the full path of the overlay route add up to a total cost value on this path, and the smaller the cost value, the higher the priority of the path to be selected. Therefore, the service packet of the overlay network of the first physical network device will select a path having the minimum cost value as the target path, i.e. the path directly routing from the node 1 to the node 5 as the target path.

It is to be noted that the identifier "down" in FIG. 5 refers to unavailability of the corresponding interface. Therefore, the presence of the identifier "down" indicates that the cost value of the interface is the maximum, and a path having the maximum value has a veto right, i.e. it is indicated that this path will not be involved in the selection. In addition, the identifier "export" in FIG. 5 refers to an identifier for an outputting interface of the physical network device. For example, export51 refers to the identifier of an interface for transmitting from the node 5 to a router or a switch.

At S500, the service packet is transmitted to a target overlay network corresponding to the target physical network device through the target path.

In an embodiment, in response to the overlay network corresponding to the first physical network device having selected an appropriate target path, the overlay network transmits the service packet to the target overlay network corresponding to the target physical network device through the determined target path.

Since the embodiments of the present disclosure include the above steps S100, S200, S300, S400 and S500, the overlay network of the first physical network device can obtain the topology and the interface connections of the underlay network according to the overlay routing table and can select an appropriate path according to the target physical network device to guide the forwarding of the service packet. Therefore, the embodiments of the present disclosure can optimize the utilization of network resources to meet the requirements of reliable and fast forwarding on the network.

Additionally, referring to FIG. 7, in an embodiment, the step S400 in which the target path corresponding to the target physical network device is determined according to the overlay routing table includes, but is not limited to, step S600.

At S600, a path having a minimum cost value among the paths corresponding to the target physical network device is selected from the overlay routing table as the target path.

In an embodiment, the overlay routing table includes the cost value of each path from the first physical network device to the target physical network device. The smaller the cost value, the higher the priority of the path to be selected. Therefore, the service packet of the overlay network of the first physical network device selects the path having the minimum cost value as the target path.

Additionally, referring to FIG. 8, in an embodiment, the route optimization method also includes, but is not limited to, steps S710, S720, S730, and S740.

At S710, in response to the underlay network updating an interface information, a new underlay routing table corresponding to the underlay network is synchronized to the local corresponding overlay network.

At S720, a new overlay routing table is generated by the overlay network according to the host name and the updated interface information in the new underlay routing table.

At S730, in response to the cost value of the target path in the new overlay routing table reaching a preset upper limit value, a new target path corresponding to the target physical network device is determined according to the new overlay routing table.

At S740, the service packet is transmitted to the target overlay network corresponding to the target physical network device through the new target path.

In an embodiment, to keep a stream of service packets on the same target path as much as possible, the service packet will not reroute by using the new overlay routing table unless an underlay network update notification triggers the calculation such that the cost value of the interface in the target path is updated to the maximum value. In response to the interface information in the underlay network being updated such that the cost value of the target path becomes the maximum value or the cost value of the target path reaches the preset upper limit value, that is, in response to the identifier "up" of the interface being updated to the identifier "down", the first physical network device acquires the updated new underlay routing table for the underlay network and synchronizes information of the new underlay routing table to the local corresponding overlay network, then the local corresponding overlay network generates the new overlay routing table according to the information of the new overlay routing table and selects the new target path corresponding to the target physical network device according to the new overlay routing table. Finally, the overlay network of the first physical network device continues to transmit the interrupted service packet to the target overlay network corresponding to the target physical network through the new target path. Therefore, the embodiments of the present disclosure can re-select the new target path in the case of an unavailable interface(s) to ensure the normal transmission of the service packets.

It is to be noted that in the route optimization method of the embodiments of the present disclosure, for the specific implementation mode of re-selecting the new target path and corresponding technical effects, the above embodiments of the route optimization method can be referred to correspondingly.

Additionally, referring to FIG. 9, in an embodiment, the above step S500 includes, but is not limited to, step S800.

At S800, the service packet is encapsulated in the tunnel format, and the encapsulated service packet is transmitted to the target physical network device through the target path, so that the target physical network device decapsulates the service packet and transmits the decapsulated service packet to the target overlay network corresponding to the target physical network device.

In an embodiment, in response to the target path being determined, the first physical network device encapsulates the service packet in the tunnel format, then transmits the encapsulated service packet to one of the second physical network devices through the target path. In response to the second physical network device receiving the service packet encapsulated in the tunnel format, the second physical network device verifies whether the local is the destination of the service packet. If the second physical network device verifies that the local is the destination of the service packet, the current second physical network device is the target physical network device, and then the target physical network device decapsulates the service packet in the tunnel format and hands over the decapsulated service packet to the target overlay network corresponding to the target physical network device to forward the decapsulated service packet to a target service.

It is to be noted that in the embodiments of the present disclosure, Virtual Extensible Local Area Network (VXLAN) Generic Protocol Encapsulation (GPE) extension, currently most widely applied by overlay, is used, where an extension header carries a list of all path interfaces; and alternatively, other tunnel type extension, such as Generic Network Virtualization Encapsulation (GENEVE) extension, may be used. The VXLAN extension header is shown in FIG. 10. Payload packets inside the VXLAN specified in RFC7348 must be Ethernet packets, thus limiting the application scope of the VXLAN protocols. To allow the VXLAN to more widely support the overlay transmission of other protocol packets, GPE encapsulation specified in RFC drafts for VXLAN GPE uses some reserved bits specified in the original FRC7348. The reserved bits specified in the original FRC7348 include reserved bits as defined below.

Ver: Version, for indicating the version of VXLAN GPE protocols Version and having an initial value of 0.

P: Next Protocol Bit, if a reserved bit of P is 1, Next Protocol field is valid.

B: BUM Traffic Bit, if a reserved bit of B is 1, it is indicated that the encapsulated packet inside the VXLAN is a BUM packet.

O: OAM Flag Bit, if a reserved bit of O is 1, it is indicated that the encapsulated packet inside the VXLAN is an OAM packet.

Next Protocol: 8 bits, for indicating the protocol format of the encapsulated packet inside the VXLAN.

In addition, the protocol defines:

|Next Protocol|Description|Reference|
|0x0|Reserved|This Document|
|0x1|IPv4|This Document|
|0x2|IPv6|This Document|
|0x3|Ethernet|This Document|
|0x4|NSH|This Document|
|0x05 . . . 0x7F|Unassigned||
|0x80 . . . 0xFF|Unassigned (shim headers)||

The embodiments of the present disclosure may use a customized 0x10 value to carry a path interface list. After the target path is determined, the first physical network device encapsulates the service packet in a tunnel format, i.e. generates a tunnel packet. If the second physical network device in the target path receives the tunnel packet, the second physical network device parses the path interface list carried by the tunnel packet for the customized protocol according to next protocol, ejects the current interface from the list and specifies transmission of the tunnel packet according to a next interface in the list. If there is no next interface, the second physical network device verifies whether the local is the destination. If the second physical network device verifies that the local is the destination, the current second physical network device is the target physical network device, and then the target physical network device decapsulates the tunnel packet and hands over the decapsulated tunnel packet to the target overlay network corresponding to the target physical network device to forward the decapsulated tunnel packet to the target service.

Additionally, referring to FIG. 11, in an embodiment, the above step S500 includes but is not limited to step S900.

At S900, the service packet is transmitted to an intermediate physical network device to enable the intermediate physical network device to forward, according to the target path, the service packet to the target overlay network corresponding to the target physical network device.

In an embodiment, in response to the target path being determined, the first physical network device encapsulates the service packet in the tunnel format, then transmits the encapsulated service packet to one of the second physical network devices through the target path. In response to the second physical network device receiving the service packet encapsulated in the tunnel format, the second physical network device verifies whether the local is the destination of the service packet. If the second physical network device verifies that the local is not the destination of the service packet, the current second physical network device forwards the service packet encapsulated in the tunnel format to a next second physical network device until the service packet is forwarded to the target physical network device, then the target physical network device decapsulates the service packet in the tunnel format and hands over the decapsulated service packet to the target overlay network corresponding to the target physical network device to forward the decapsulated service packet to the target service.

In an implementation, after the target path is determined, the first physical network device encapsulates the service packet in the tunnel format, i.e. generates a tunnel packet. If the second physical network device in the target path receives the tunnel packet, the second physical network device parses the path interface list carried by the tunnel packet for the customized protocol according to next protocol, ejects a current interface from the list and specifies transmission of the tunnel packet according to a next interface in the list to the next second physical network device and so on, until to the target physical network device. Then, the target physical network device decapsulates the tunnel packet and hands over the decapsulated tunnel packet to the target overlay network corresponding to the target physical network device to forward the decapsulated tunnel packet to the target service.

Figure 12:
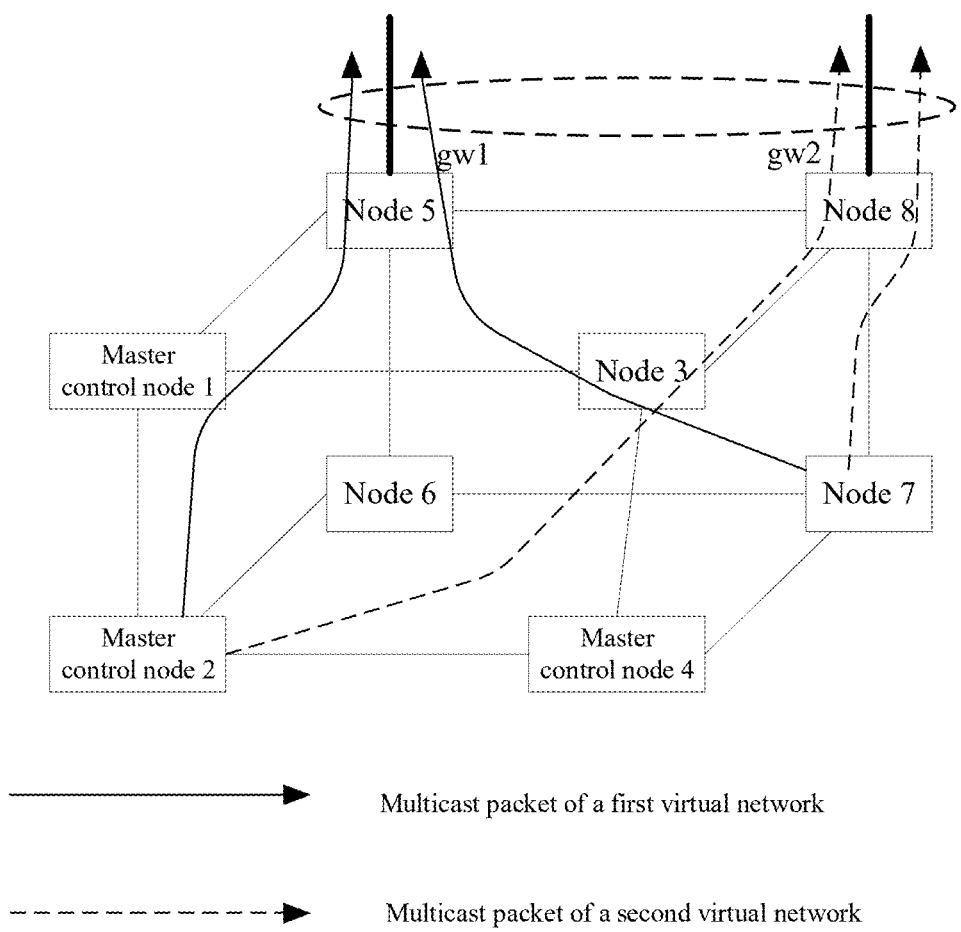
FIG. 12 is a schematic diagram of a multicast mode in a route optimization method provided by an embodiment of the present disclosure.

Additionally, referring to FIG. 12, in an embodiment, in response to the service packet being in a unicast mode, the physical network devices may acquire and maintain the information of the underlay routing table and decide a unicast forwarding path individually; and in response to the service packet being in a multicast mode, it is feasible to select at least two physical network devices as master nodes according to cluster algorithms. The overlay network on the master nodes collects information of all nodes and decides a multicast forwarding path.

In an embodiment, the embodiments of the present disclosure provide load sharing links through cross-board aggregation when both GW1 and GW2 function as L2 gateways. Multicast routing requires centralized determination of multicast port groups, and the topology is shown in FIG. 12. At least two of all nodes are selected as the master nodes in the device through the cluster algorithms. In the embodiments of the present disclosure, three master nodes of a High Available (HA) cluster are selected, and the three nodes are responsible for deciding the multicast routing and optimizing local routing results in addition to completing the functions of generating the underlay routing table and the overlay routing table.

It is to be noted that the L2 gateways are typically provided with aggregated links to support load sharing and fault tolerance. In a virtualized network, supporting the cross-board aggregation also needs centralized control points to uniformly distribute information required for negotiation of aggregation groups and maintains distribution and deliver of unified information of the aggregation groups in a decision-making module.

Moreover, once the negotiation of the aggregation groups succeeds, if different nodes in the same network decide multicast paths by themselves individually, multicast packets may be simultaneously transmitted to two ports at the peer end, and the multicast packets received from the peer end may also be forwarded from another port. Therefore, in views of the multicast packets, it is also necessary to select a determined multicast outgoing interface for each virtual network according to the cost value, and all multicast packets in the network are transmitted from the same multicast outgoing interface.

In addition, local routing results of each node may also be optimized or guaranteed paths may also be provided for some important services. If an important service specifies its bandwidth and delay requirements, after a path that meets the requirements of the important service is selected, a bandwidth and transmit and receive information of each interface are updated through interactive interfaces of the overlay and the underlay to reserve the bandwidth to prevent conflicts in the local routing of the nodes.

Figure 13:
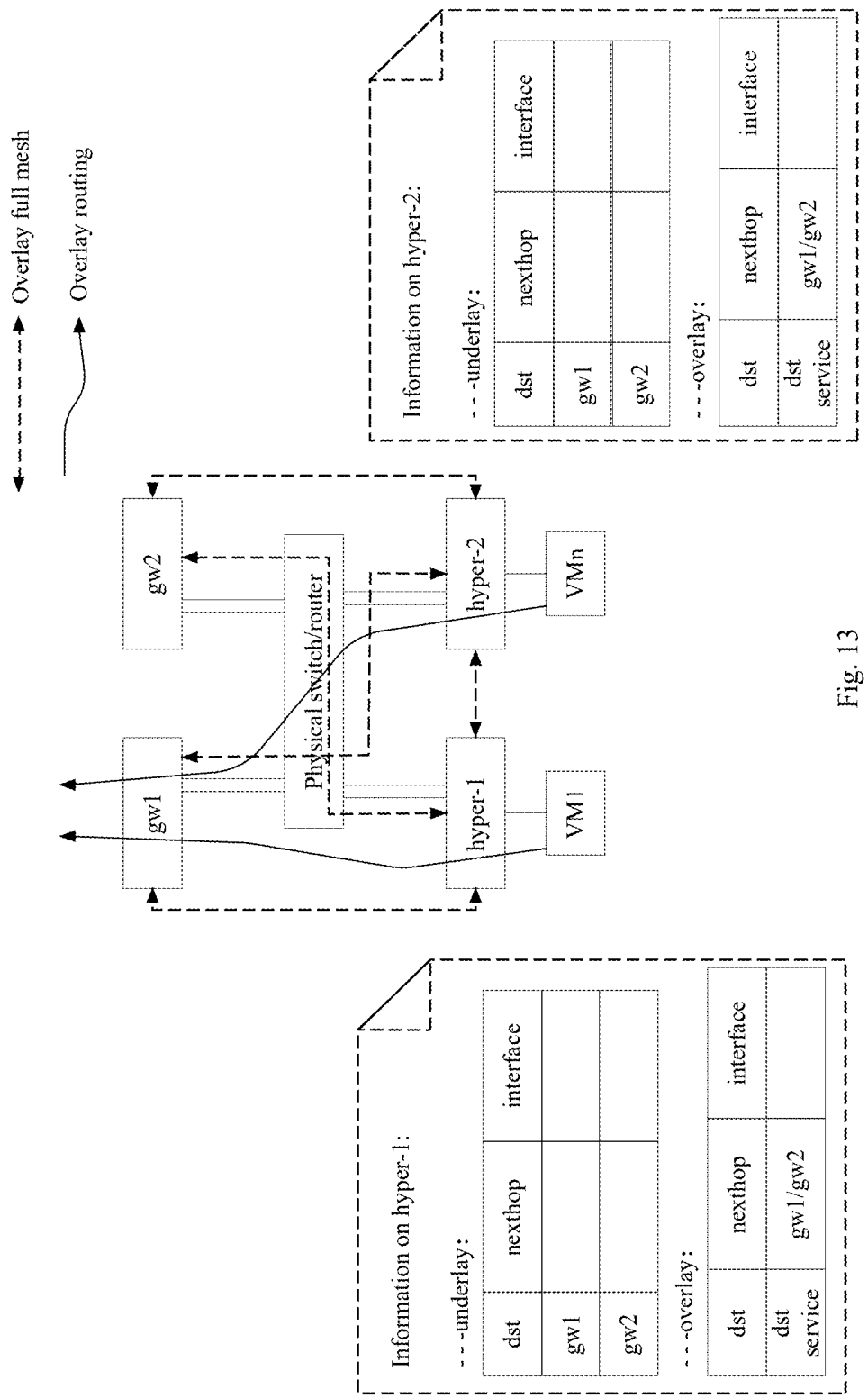
FIG. 13 is a flowchart of routing of a service packet in an existing overlay network.
Figure 14:
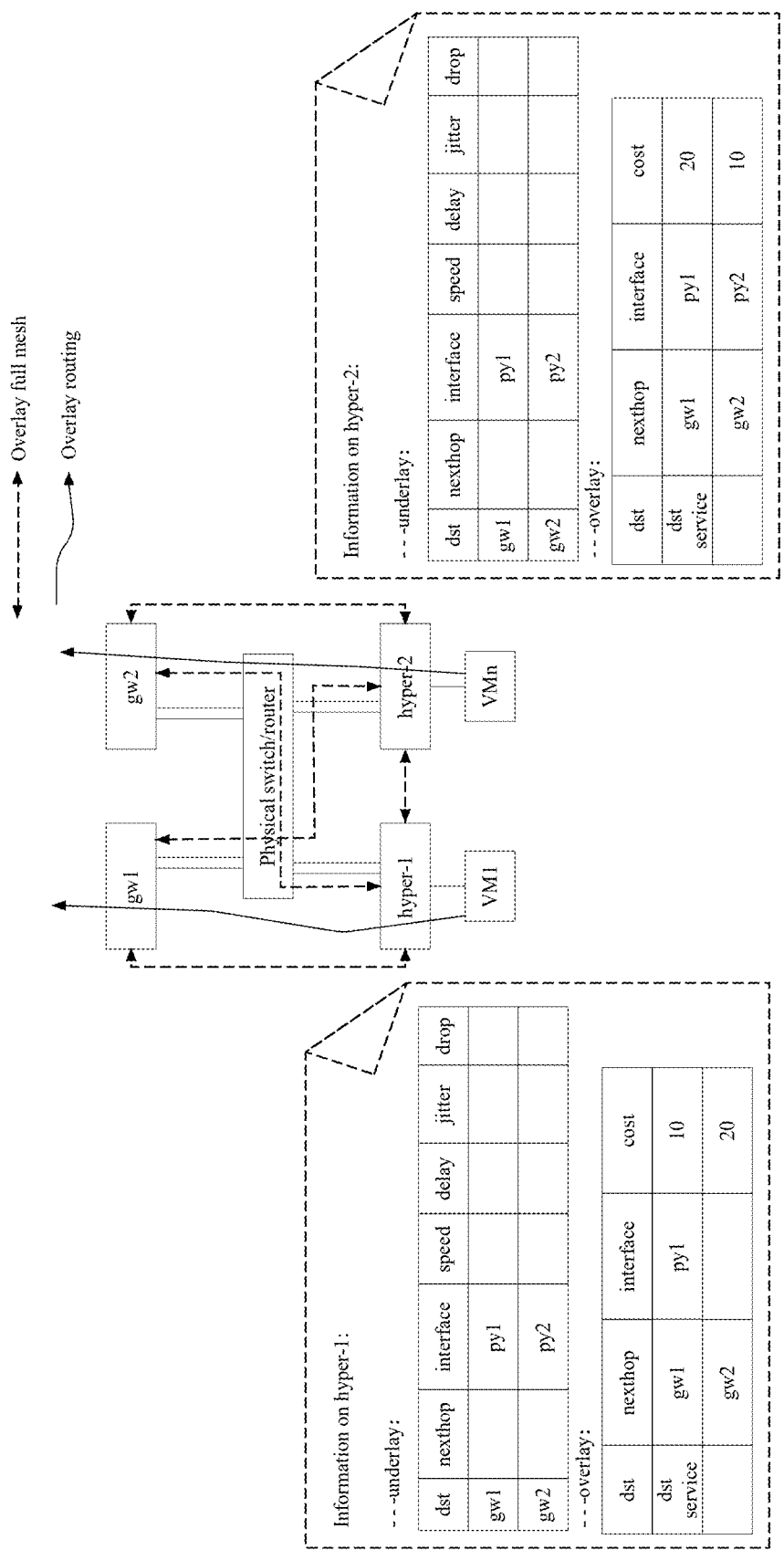
FIG. 14 is a flowchart of routing of a service packet in an overlay network provided by an embodiment of the present disclosure.

Based on the embodiments of the route optimization method, the existing routing flow of the service packet in FIG. 13 can be optimized to the routing flow in FIG. 14 of the embodiments of the present disclosure. Here, hyper-1 and hyper-2 in FIGS. 13 and 14 is one of the nodes 1 through 8 in FIGS. 3 and 4, VM1 and VMn are corresponding virtual machines on the nodes. For the routing flow of the existing service packet in FIG. 13, underlay information on the node only includes destination gw1 and destination gw2, and overlay information only includes destination dst service and a next hop port gw1 or gw2, so the service packets on the virtual machines VM1 and VMn in FIG. 13 are likely to be transmitted from the same gw. As a result, network resources cannot be utilized faster and better, and fast and reliable network services cannot be provided for various applications. In the embodiments of the present disclosure, the underlay information on the node in FIG. 14 includes not only the destination gw1 and gw2, but also py1 corresponding to the destination gw1 and py2 corresponding to the destination gw2, where py is a physical interface between gw and hyper. In addition, the overlay information on the node in FIG. 14, in addition to including the destination dst service, includes the next hop port gw1 and gw2 and includes the py1 corresponding to the gw1 and the py2 corresponding to the gw2. Therefore, the service packets on the virtual machines VM1 and VMn in FIG. 14 select the path having the minimum cost value such that the service packets of the virtual machine VM1 are transmitted from the gw1 and the service packets of the virtual machine VMn are transmitted from the gw2, and thus network resources can be utilized faster and better, and fast and reliable network services can be provided for various applications.

Based on the route optimization method described above, various embodiments of the physical network device and computer-readable storage medium of the present disclosure are presented below.

In addition, an embodiment of the present disclosure provides a physical network device, including: a memory, a processor, and a computer program stored in the memory and executable by the processor.

The processor and the memory may be connected by a bus or by other means.

It should be noted that the physical network device in this embodiment may be applied to the system architecture platform in the embodiment shown in FIG. 1. The physical network device in this embodiment can constitute a part of the system architecture platform in the embodiment shown in FIG. 1. The two are of the same inventive concept, and therefore, the two have the same implementation principle and beneficial effects, and further details will not be given herein.

Non-transient software programs and instructions required to realize the route optimization method in the above embodiments are stored in the memory, and when executed by the processor, cause the processor to implement the route optimization method in the above embodiments, for example, execute the above-described method steps S100 to S500 in FIG. 2, S600 in FIGS. 7, S710 to S740 in FIG. 8, S800 in FIG. 9, or S900 in FIG. 11.

The apparatus embodiments described above are only for illustration. The units described as separate components may or may not be physically separated, that is, they may be located at one place or distributed to multiple network units. Some or all of the modules can be selected according to actual needs to achieve the purpose of this embodiment.

Furthermore, an embodiment of the present disclosure also provides a computer-readable storage medium storing computer-executable instructions which, when executed by a processor, cause the processor to perform the route optimization method described above. For example, the computer-executable instructions, when executed by a processor in any of the physical network device embodiments, cause the processor to execute the route optimization method in the above embodiments, for example, execute the above-described method steps S100 to S500 in FIG. 2, S600 in FIGS. 7, S710 to S740 in FIG. 8, S800 in FIG. 9, or S900 in FIG. 11.

The embodiments of the present disclosure include the following steps. A first physical network device acquires a probe packet from at least one second physical network device, where the probe packet includes a host name of the second physical network device and interface information of the second physical network device; then generates, according to the probe packet, an underlay routing table corresponding to an underlay network, where the underlay routing table includes the host name of the second physical network device and the interface information of the second physical network device; synchronizes the underlay routing table to a local corresponding overlay network to enable the overlay network to generate an overlay routing table according to the host name and the interface information in the underlay routing table; acquires a service packet through the overlay network and determines a target physical network device, and determines, according to the overlay routing table, a target path corresponding to the target physical network device; and finally transmits the service packet to a target overlay network corresponding to the target physical network device through the target path. According to the schemes provided by the embodiments of the present disclosure, the overlay network of the first physical network device can obtain the topology and the interface connections of the underlay network according to the overlay routing table and can select an appropriate path according to the target physical network device to guide the forwarding of the service packet. Therefore, the embodiments of the present disclosure can optimize the utilization of network resources and meet the requirements of reliable and fast forwarding on the network.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those having ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those having ordinary skill in the art that communication media typically contain computer-readable instructions, data structures, program modules or other data in a modulated data signal such as a carrier wave or other transmission mechanism, and can include any information delivery media.

The above is a detailed description of some embodiments of the present disclosure. However, the present disclosure is not limited to the above-mentioned embodiments. Those having ordinary skill in the art can also make various equivalent modifications or replacements without departing from the scope of the present disclosure, and these equivalent modifications or replacements are all included in the scope defined by the appended claims of the present disclosure.

What is claimed is:

1. A route optimization method, which is applied to a first physical network device, the method comprising:
    acquiring a probe packet from at least one second physical network device, wherein the probe packet comprises a host name of the second physical network device and interface information of the second physical network device;
    generating, according to the probe packet, an underlay routing table corresponding to an underlay network, wherein the underlay routing table comprises the host name of the second physical network device and the interface information of the second physical network device;
    synchronizing the underlay routing table to a local corresponding overlay network to enable the overlay network to generate an overlay routing table according to the host name and the interface information in the underlay routing table;
    acquiring a service packet through the overlay network and determining a target physical network device, and determining, according to the overlay routing table, a target path corresponding to the target physical network device; and
    transmitting, through the target path, the service packet to a target overlay network corresponding to the target physical network device;
    wherein transmitting the service packet to a target overlay network corresponding to the target physical network device through the target path comprises:
    encapsulating the service packet in a tunnel format, and transmitting the encapsulated service packet to the target physical network device through the target path, such that the target physical network device is capable of decapsulating the service packet and transmitting the decapsulated service packet to the target overlay network corresponding to the target physical network device.

2. The route optimization method of claim 1, wherein:
    the overlay routing table comprises respective cost values of paths from the first physical network device to the target physical network device, wherein the cost values of the paths are determined by the interface information in the underlay routing table.

3. The route optimization method of claim 2, wherein determining, according to the overlay routing table, a target path corresponding to the target physical network device comprises:
    Selecting, from the overlay routing table, a path having a minimum cost value among the paths corresponding to the target physical network device, as the target path.

4. The route optimization method of claim 3, further comprising:
    in response to the underlay network updating the interface information, synchronizing a new underlay routing table corresponding to the underlay network to the local corresponding overlay network; and
    generating a new overlay routing table by the overlay network according to the host name and the updated interface information in the new underlay routing table;
    in response to the cost value of the target path in the new overlay routing table reaching a preset upper limit value, determining, according to the new overlay routing table, a new target path corresponding to the target physical network device; and
    transmitting, through the new target path, the service packet to the target overlay network corresponding to the target physical network device.

5. The route optimization method of claim 1, wherein transmitting the service packet to a target overlay network corresponding to the target physical network device through the target path comprises:
    transmitting the service packet to an intermediate physical network device to enable the intermediate physical network device to forward, according to the target path, the service packet to the target overlay network corresponding to the target physical network device.

6. The route optimization method of claim 1, wherein a synchronization mode for synchronizing the underlay routing table to the local corresponding overlay network comprises periodic synchronization and/or change synchronization.

7. The route optimization method of claim 1, wherein the interface information comprises at least one of: interface maximum speed information, current packet receive and transmit speed information, delay information, jitter information, and packet loss information.

8. A first physical network device, comprising: a memory, a processor, and a computer program stored in the memory and executable by the processor, wherein the computer program, when executed by the processor, causes the processor to perform a route optimization method comprising:
    acquiring a probe packet from at least one second physical network device, wherein the probe packet comprises a host name of the second physical network device and interface information of the second physical network device;
    generating, according to the probe packet, an underlay routing table corresponding to an underlay network, wherein the underlay routing table comprises the host name of the second physical network device and the interface information of the second physical network device;
    synchronizing the underlay routing table to a local corresponding overlay network to enable the overlay network to generate an overlay routing table according to the host name and the interface information in the underlay routing table;
    acquiring a service packet through the overlay network and determining a target physical network device, and determining, according to the overlay routing table, a target path corresponding to the target physical network device; and
    transmitting, through the target path, the service packet to a target overlay network corresponding to the target physical network device;
    wherein transmitting the service packet to a target overlay network corresponding to the target physical network device through the target path comprises:
    encapsulating the service packet in a tunnel format, and transmitting the encapsulated service packet to the target physical network device through the target path, such that the target physical network device is capable of decapsulating the service packet and transmitting the decapsulated service packet to the target overlay network corresponding to the target physical network device.

9. A non-transitory computer-readable storage medium storing computer-executable instructions which, when executed by a processor, cause the processor to perform the route optimization method of claim 1.

10. The route optimization method of claim 2, wherein transmitting the service packet to a target overlay network corresponding to the target physical network device through the target path comprises:

transmitting the service packet to an intermediate physical network device to enable the intermediate physical network device to forward, according to the target path, the service packet to the target overlay network corresponding to the target physical network device.

11. The route optimization method of claim 3, wherein transmitting the service packet to a target overlay network corresponding to the target physical network device through the target path comprises:

transmitting the service packet to an intermediate physical network device to enable the intermediate physical network device to forward, according to the target path, the service packet to the target overlay network corresponding to the target physical network device.

12. The route optimization method of claim 4, wherein transmitting the service packet to a target overlay network corresponding to the target physical network device through the target path comprises:

transmitting the service packet to an intermediate physical network device to enable the intermediate physical network device to forward, according to the target path, the service packet to the target overlay network corresponding to the target physical network device.

13. The route optimization method of claim 2, wherein a synchronization mode for synchronizing the underlay routing table to the local corresponding overlay network comprises periodic synchronization and/or change synchronization.

14. The route optimization method of claim 3, wherein a synchronization mode for synchronizing the underlay routing table to the local corresponding overlay network comprises periodic synchronization and/or change synchronization.

15. The route optimization method of claim 4, wherein a synchronization mode for synchronizing the underlay routing table to the local corresponding overlay network comprises periodic synchronization and/or change synchronization.

\* \* \* \* \*